UNITED STATES PATENT OFFICE.

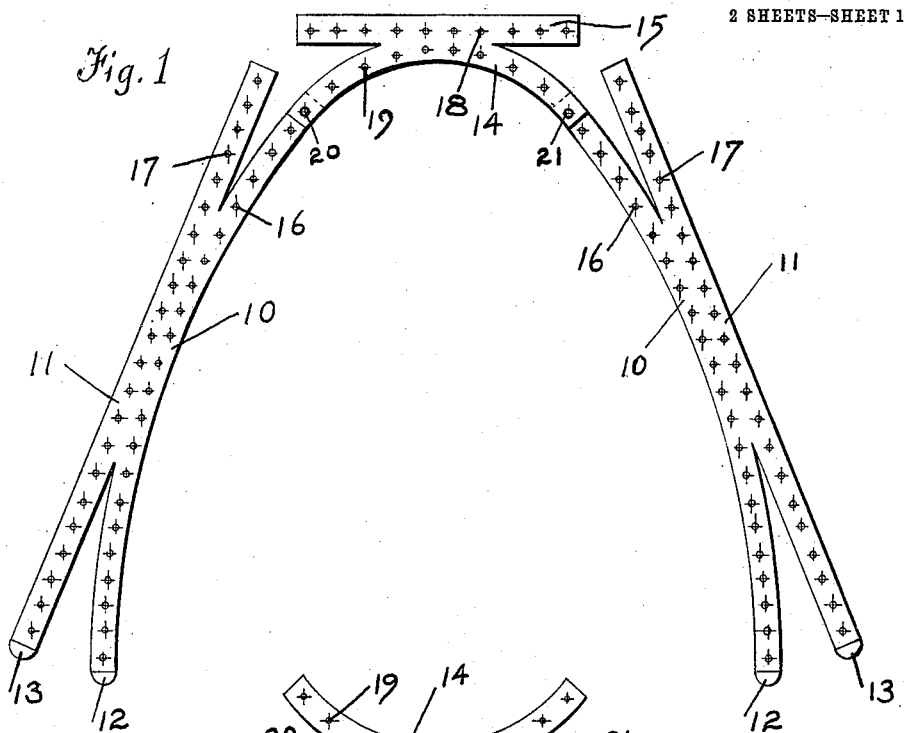
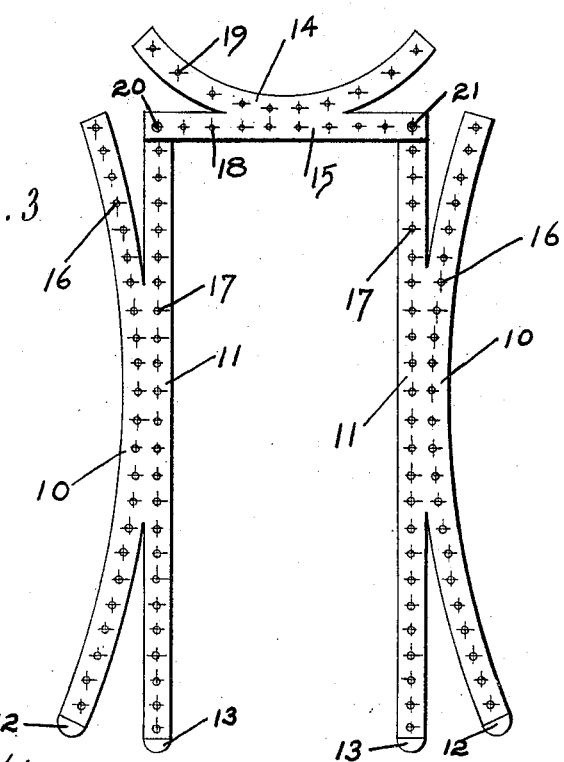

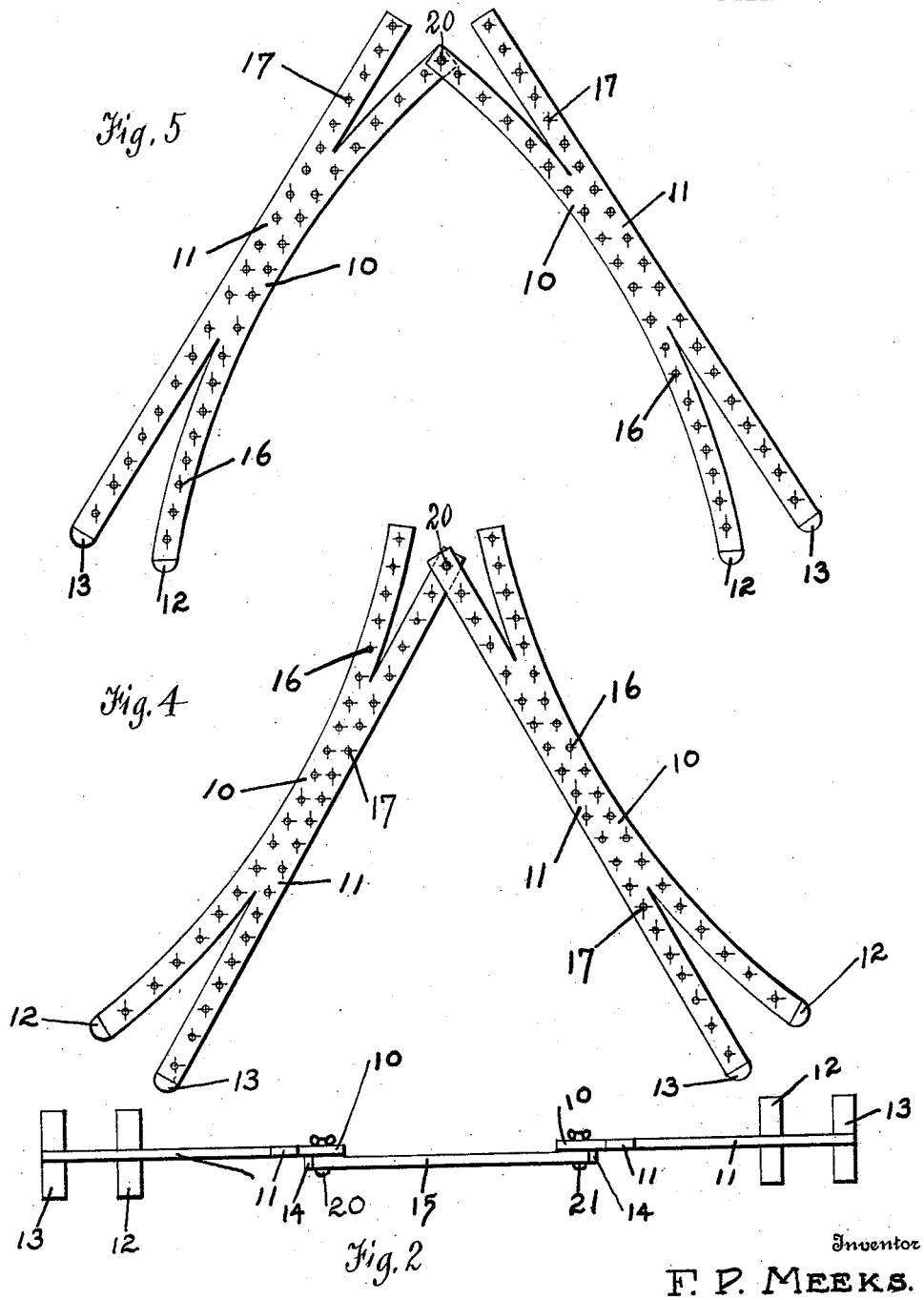

FREDERICK P. MEEKS, OF ARDMORE, PENNSYLVANIA.

PRUNING-GAGE.

975,057.

Specification of Letters Patent.

Patented Nov. 8, 1910.

Application filed June 20, 1910. Serial No. 567,911.

*To all whom it may concern:*

Be it known that I, FREDERICK P. MEEKS, a citizen of the United States, residing at Ardmore, in the county of Montgomery, State of Pennsylvania, have invented certain new and useful Improvements in Pruning-Gages; and I do hereby declare the following to be a full, clear, and exact description of the invention, such as will enable others skilled in the art to which it appertains to make and use the same.

The invention relates to improvements in devices for guiding horticulturists, landscape gardeners, and others in pruning and trimming shrubs, hedges, and the like, and to impart thereto any desired form or outline.

With this and other objects in view, the invention consists in certain novel features of construction as hereinafter shown and described and then specifically pointed out in the claims; and, in the drawings illustrative of the preferred embodiment of the invention, Figure 1 is a side elevation of the improved device arranged to correspond to one form of a hedge or shrub, Fig. 2 is a plan view of the same, Figs. 3, 4, and 5 are views illustrating different forms in which the improved device may be arranged.

The improved device is formed of three members, two side members and a head member, the side members being exact duplicates of each other. Each side member comprises a curved portion 10 and a straight portion 11, the two portions being formed from a single piece, preferably of wood, and united back to back. The portion 10 is provided with a lateral foot or support 12, while the portion 11 is provided with a similar lateral foot or support 13. The head member comprises a curved portion 14 and a straight portion 15, the portions 14—15 being in one piece, preferably of wood, and similar in outline to the side members 10—11 except that the curvature of the member 14 is of less radius than the curvature of the members 10—11. The members 10—11 are provided respectively with apertures 16—17, while the members 14—15 are provided respectively with similar apertures 18—19. The apertures in the various members provide for coupling the members together in different positions by clamp bolts 20—21 to provide internal outlines for the hedges of varying shapes. For instance when arranged as shown in Fig. 1 with the curved portions 10—14 arranged inwardly an elliptical interior outline is produced, while in Fig. 3 the device is arranged with the straight portions 11—15 located inwardly, thereby producing an oblong interior outline. In Fig. 4 the smaller members 14—15 are discarded and the side members 10—11 united by one of the clamp bolts to form an inverted V-shaped or pyramidal-shaped interior outline, while in Fig. 5 the curved members 10 are united with one of the clamp bolts to form an outline of pyramidal form having curved lines.

It will be obvious that the device may be arranged in a variety of forms by simply changing the relative locations of the parts within the scope of the apertures.

With a device thus constructed when a hedge or shrub is to be pruned or trimmed the device is connected to correspond to the desired outline, as for instance, the elliptical form shown in Fig. 1, and the device arranged with its feet 12 resting upon the ground upon opposite sides of the hedge or shrub with the portions 10—14 bearing over the shrub. This forms a guide for the operator in pruning the shrub or hedge which may be pruned to correspond to the device and the latter moved along the hedge as the pruning progresses.

The improved device may be thus arranged to fit shrubs or hedges of different sizes and forms without structural change in the device, by simply adjusting the parts within the range of the apertures and the clamp screws.

The improved device is simple in construction, and can be made of any required material and of any required size.

What is claimed is:—

1. A device of the class described comprising side members formed of a curved portion and a straight portion provided respectively with a plurality of apertures spaced apart, a head member formed of a curved portion and a straight portion and each provided with a plurality of apertures spaced apart, and means operating through said apertures for adjustably uniting the parts.

2. A device of the class described comprising two members each formed of a curved portion and a straight portion and provided respectively with a plurality of apertures spaced apart, a lateral supporting foot connected to each of the side portions, a head member formed of a curved portion and a straight portion and provided respectively with apertures spaced apart, and clamping means operating through the apertures.

In testimony whereof, I affix my signature, in presence of two witnesses.

FREDERICK P. MEEKS.

Witnesses:
　GEORGE WILLIS,
　PHILIP CASSIDY.